Patented Oct. 23, 1934

1,977,748

UNITED STATES PATENT OFFICE 1,977,748

METHOD OF MAKING RUBBER BONDED ABRASIVE ARTICLES

Duane E. Webster, Worcester, Mass., assignor to Norton Company, Worcester, Mass., a corporation of Massachusetts No Drawing. Application January 15, 1931, Serial No. 509,035

7 Claims. (Cl. 51—278)

This invention relates to abrasive articles and more particularly to rubber bonded abrasive articles which are used as grinding wheels and the like and to a method of making the same.

Abrasive articles have heretofore been made of well known abrasive materials, such as crystalline alumina, silicon carbide and other suitable abrasives, in which the abrasive grains are bonded together by a vulcanizable material such as rubber. One method of making such articles involves preparing a rubber compound by incorporating with a sheet of crude rubber stock various compounding ingredients such as dry sulfur. This is accomplished on "mixing rolls" between which the stock is kneaded and repeatedly passed through simultaneously with the addition of the added sulfur. In a like manner, the abrasive material is worked into the sheeted compound during a second operation on the mixing rolls. The resultant sheet is then rolled to a desired thickness and a wheel blank of a diameter corresponding to the specified dimensions is cut therefrom which is thereafter vulcanized in accordance with standard practice.

One objection to this prior procedure is that during the formation of the sulfur-rubber compound there is a tendency for any fine material in the mix, such as sulfur, abrasive or a filler, which is present in a comminuted or flour-like condition, to become easily disturbed during the mixing action so that the dust-like particles are raised in a dense cloud and thrown from the mixing machine so as to load the air in the vicinity of the mixing apparatus. Such working conditions are very unsatisfactory in that the dust laden atmosphere is very disagreeable to work in, due to the irritating properties of the sulfur, which makes it difficult for the workmen to perform the mixing operations in a satisfactory manner. Furthermore, this dusting reduces the amount of available sulfur in the mix, of which a predetermined amount is employed to insure proper vulcanization of the rubber and the loss of which detrimentally affects the structure and fibre of the finished article.

It has also been found that during the manufacture of the rubber-sulfur compound the fine particles of dry sulfur tend to ball into large lumps due to pressure and frictional heat of the mixing rolls thereby making it difficult to uniformly work the sulfur into the rubber sheet.

It is accordingly an object of this invention to overcome these difficulties and to provide an improved method of making rubber bonded abrasive articles whereby the ingredients which enter into the article are more easily and economically worked during the process of manufacture.

Further objects will be apparent in the following disclosure.

In accordance with this invention, rubber bonded abrasive articles, such as grinding wheels and the like, may be produced satisfactorily from a crude rubber sheet in which abrasive and sulfur are incorporated if a small amount of rubber latex is mixed therewith. The rubber latex preferably should not have less than 30% by weight of total rubber. The term "rubber latex" as used herein is intended to mean a milky or lactiferous sap or juice obtained from certain plants, such as the "Heva brasiliensis", from which rubber is commonly obtained. By the term "crude rubber sheet" I mean the rough, irregularly shaped sheet of crude rubber as produced from the repeated working of large lumps of raw rubber stock through a series of compression rolls prior to the operation of incorporating the various abrasive and compounding ingredients therein.

In compounding the ingredients into this crude rubber sheet I prefer to follow the usual practice of employing the sulfur in a finely divided state, such as a flour. In the working of the abrasive and sulfur into the rubber I have found that if the dry sulfur particles are wetted slightly with rubber latex they enable the abrasive mix to be more uniformly and thoroughly distributed through the rubber mass. Furthermore, the latex-dampened sulfur when compounded with the abrasive and the crude rubber sheet by milling the batch of wetted sulfur and abrasive into the sheet of crude rubber on the mixing rolls of a roll mill will not "ball" or otherwise form objectionable clusters and lumps as was heretofore the case when dry sulfur was so handled. Due to the fact that the liquid latex evaporates slowly and prolongs the damp effect in the mix when the wetted sulfur is mixed with the abrasive grains, the damp sulfur will then become attached and coat the surface of the abrasive grains to thereby prevent any dusting tendencies of the sulfur, abrasive or any filler there contained while the entire mixture is thoroughly and uniformly compounded with the rubber sheet. The proportions of rubber latex are suitably adjusted so that there will be no loose dry ingredients but the mix will be sufficiently dampened to promote good adhesion of the ingredients without producing a mixture which would be too gummy and sticky to work easily. If desirable a suitable coagulant, such as zinc acetate, may be employed but it has been found that satisfactory coagulation of the latex may result from the combined action of the frictional heat evolved during the milling of the compound and the normal evaporation of the latex in the air.

One manner of carrying out my invention consists in mixing a small amount of rubber latex with a predetermined quantity of flour sulfur to form a mass of damp consistency. Predetermined proportions of abrasive grains and latex-coated sulfur are then intimately and thoroughly mixed together in a suitable manner and the resulting mixture incorporated with the crude rubber sheet during the usual milling operation on the mixing rolls to form a rubber compound embodying rubber, sulfur and abrasive material. When desired, a suitable vulcanization accelerator, such as diphenylguanidine or its equivalent, may be added to the mixture at any convenient stage of the process prior to vulcanization but preferably it is added during the incorporation of the ingredients with the crude rubber sheet, as for example, after three quarters of the total abrasive has been worked in. The accelerator may also be poured over the rubber or over the abrasive mixture during the process of working the mass into the rubber. Thereafter the sheet of rubber compound may be rolled down to form a sheet having that thickness from which a wheel of the desired character may be cut and then vulcanized to set the bond.

In the first step of my preferred method I prepare a mixture of latex coated sulfur by slowly adding to a weighed amount of flour sulfur, during the process of stirring in a suitable mixing machine, that amount of rubber latex which will form an intimate mixture of latex and sulfur which will be of a damp consistency. A satisfactory form of mixing machine may comprise a rotary tumbling barrel within which revolves a rotatable member carrying a series of paddles attached thereto which stir up the material contained therein and keep it in a state of continuous motion to provide a uniform and well distributed mixing of the sulfur and the latex. The damp mass is then removed from the mixing machine and stored in a covered box until needed. It is to be understood that various mixtures of sulfur and latex may be employed in which the percentage of latex may be varied from 1 to 10% by weight of the sulfur content in the mix, if desired. Suitable proportions of sulfur and latex are as follows:

| | Pounds |
|---|---|
| Abrasive (crystalline alumina) | 87.5 |
| Sulfur | 16½ |

In the manufacture of grinding wheels or other abrasive articles, a predetermined amount of the damp sulfur-latex mass is mixed with a definite amount of heated abrasive material either by hand or mechanically to form a homogeneous mixture of abrasive and latex-coated sulfur.

As a specific example of a suitable formula which will be satisfactory for the purpose of making a grinding wheel, I may use granular crystalline alumina abrasive of a grit size which will just pass through a screen of 14 meshes to the linear inch and bond them with a rubber bond, the ingredients being employed in the following proportions:

| | Per cent by weight |
|---|---|
| Abrasive (crystalline alumina) | 87.5 |
| Rubber and sulfur-latex mixture | 12.5 |
| | 100.0 |

Of this 12.5 per cent by weight of rubber and sulfur-latex mixture it is preferred that the ingredients be so proportioned that 30% by weight or 3.75 lbs. will be sulfur and the remaining 70% by weight or 8.75 lbs. will be rubber (i. e. raw rubber bond and the rubber from the latex). However, a satisfactory product may be obtained if the sulfur content is from 20 to 40% of the total rubber-sulfur-latex mix and the latex proportioned accordingly. It is to be understood that the above proportions of abrasive and sulfur-latex mixture may be varied to meet the particular grinding characteristics and wheel structure desired. It is also obvious that the grit size of the abrasive grain may be varied within wide limits, depending upon the grinding action desired.

The crude or raw rubber may now be repeatedly passed between a pair of compression mixing rolls in accordance with standard milling practice and small increments of the required amount of the sulfur-latex and abrasive mixture, in the form of a damp crumbly mass, added at desired intervals whereby an intimate and homogeneous mixture of the ingredients is effected with the rubber. In practice, small quantities of the crumbly mixture are repeatedly spread over the surface of the rubber sheet and the sheet folded and successively passed through the mixing rolls until the entire mix is incorporated with the rubber. When a greater portion of the mixture has been worked into the rubber, an accelerator may be added to the rubber to carry the subsequent vulcanization to completion, and the milling operation is continued until all of the abrasive mass is embodied into the rubber. Since the abrasive-sulfur-latex mass is still damp, the latex will serve to permit the grains of abrasive, to which adhere particles of sulfur and latex, to slip more easily into the tough springy rubber than would be otherwise the case if the mixture were in a dry condition.

The rubber sheet containing the mixed batch of the ingredients incorporated into the rubber may now be passed through a set of rolls which calender and reduce the sheet to a uniform and desired thickness from which the wheels are to be cut. The calendered rubber sheet is then cut into wheel outlines of the proper size and shape corresponding to the dimensions of the wheel required. A wheel thus cut out is then placed in a mold of required dimensions and pressed under the influence of pressure and moderate heat to form the material to a desired volume. The molded wheel is thereafter vulcanized in accordance with standard practice to mature the bond.

In accordance with this invention, this method provides a simple and effective way of producing a rubber bonded abrasive article upon a commercial scale which will have the desired grinding and structural characteristics. Moreover, the invention lessens the dusting hazard together with the attendant manufacturing losses and enables the ingredients to work in a more satisfactory manner.

Having thus described my invention, what I claim as new and desire to secure by Letters Patent is:

1. The method of making a vulcanized rubber bonded abrasive article which comprises mixing together sulfur and rubber latex, mixing this mixture with abrasive material, milling the resultant mixture into a sheet of crude rubber to form an abrasive-rubber compound, forming an article from the compound, and subsequently vulcanizing the article to set the bond.

2. The method of compounding rubber with comminuted sulfur which consists in treating the sulfur particles with rubber latex to render the fine particles of sulfur slightly damp and in a substantially dustless condition, and then milling the dampened particles into a sheet of crude rubber.

3. The method of incorporating abrasive grains and sulfur with crude plastic rubber which comprises the steps of wetting the abrasive and sulfur particles with rubber latex, and then milling the wet particles into the rubber body.

4. A method of making a rubber composition suitable for the manufacture of shaped vulcanized abrasive articles comprising the steps of wetting finely divided sulfur with rubber latex, mixing it with the abrasive whereby the sulfur becomes attached and adheres to the abrasive grains to form a coating thereon and thereby serves to enable the grains to slip more easily into the raw rubber, adding a vulcanization accelerator to the abrasive mixture and then milling the mixture into a body of crude rubber.

5. The method of making a rubber bonded abrasive article comprising the steps of mixing abrasive grains with rubber latex and a finely divided vulcanizing agent in proportions to form a damp, crumbly mixture in which the grains of abrasive are coated with particles of rubber and the vulcanizing agent, milling the mixture thus obtained and an accelerator into a body of crude rubber, shaping an article from the rubber body, and vulcanizing the rubber.

6. The method of making a rubber bonded abrasive article comprising the steps of mixing abrasive grains and sulfur with rubber latex to cause the particles of sulfur and latex to adhere to and coat abrasive grains, coagulating the latex in the mixture thus obtained and milling the mass into a body of crude rubber to provide a substantially uniform mixture thereof, shaping an article therefrom, and thereafter vulcanizing the same.

7. The method of making rubber bonded abrasive articles comprising the steps of mixing finely divided sulfur with rubber latex in proportions to form a mixture of a damp consistency with the particles of sulfur coated with latex, mixing abrasive grains with the latex-coated sulfur particles in predetermined proportions to obtain a desired structure in the finished article, whereby the particles of latex-coated sulfur become attached and adhere to the abrasive grains to form a coating thereon and thereby serve to enable the abrasive mixture to slip more easily into a crude rubber body when subsequently compounded therewith, coagulating the mixture thus obtained and milling the mass into a body of crude rubber, shaping an article therefrom, and thereafter vulcanizing the rubber.

DUANE E. WEBSTER.

---

CERTIFICATE OF CORRECTION.

Patent No. 1,977,748.   October 23, 1934.

DUANE E. WEBSTER.

It is hereby certified that error appears in the printed specification of the above numbered patent requiring correction as follows: Page 2, lines 55 and 56, strike out the formula and insert instead.

Sulfur --------------------------------------------------- 16½
Rubber Latex ---------------------------------------------- 1

And that the said Letters Patent should be read with these corrections therein that the same may conform to the record of the case in the Patent Office.

Signed and sealed this 5th day of February, A. D. 1935.

Leslie Frazer
(Seal)   Acting Commissioner of Patents.

from the compound, and subsequently vulcanizing the article to set the bond.

2. The method of compounding rubber with comminuted sulfur which consists in treating the sulfur particles with rubber latex to render the fine particles of sulfur slightly damp and in a substantially dustless condition, and then milling the dampened particles into a sheet of crude rubber.

3. The method of incorporating abrasive grains and sulfur with crude plastic rubber which comprises the steps of wetting the abrasive and sulfur particles with rubber latex, and then milling the wet particles into the rubber body.

4. A method of making a rubber composition suitable for the manufacture of shaped vulcanized abrasive articles comprising the steps of wetting finely divided sulfur with rubber latex, mixing it with the abrasive whereby the sulfur becomes attached and adheres to the abrasive grains to form a coating thereon and thereby serves to enable the grains to slip more easily into the raw rubber, adding a vulcanization accelerator to the abrasive mixture and then milling the mixture into a body of crude rubber.

5. The method of making a rubber bonded abrasive article comprising the steps of mixing abrasive grains with rubber latex and a finely divided vulcanizing agent in proportions to form a damp, crumbly mixture in which the grains of abrasive are coated with particles of rubber and the vulcanizing agent, milling the mixture thus obtained and an accelerator into a body of crude rubber, shaping an article from the rubber body, and vulcanizing the rubber.

6. The method of making a rubber bonded abrasive article comprising the steps of mixing abrasive grains and sulfur with rubber latex to cause the particles of sulfur and latex to adhere to and coat abrasive grains, coagulating the latex in the mixture thus obtained and milling the mass into a body of crude rubber to provide a substantially uniform mixture thereof, shaping an article therefrom, and thereafter vulcanizing the same.

7. The method of making rubber bonded abrasive articles comprising the steps of mixing finely divided sulfur with rubber latex in proportions to form a mixture of a damp consistency with the particles of sulfur coated with latex, mixing abrasive grains with the latex-coated sulfur particles in predetermined proportions to obtain a desired structure in the finished article, whereby the particles of latex-coated sulfur become attached and adhere to the abrasive grains to form a coating thereon and thereby serve to enable the abrasive mixture to slip more easily into a crude rubber body when subsequently compounded therewith, coagulating the mixture thus obtained and milling the mass into a body of crude rubber, shaping an article therefrom, and thereafter vulcanizing the rubber.

DUANE E. WEBSTER.

CERTIFICATE OF CORRECTION.

Patent No. 1,977,748.     October 23, 1934.

DUANE E. WEBSTER.

It is hereby certified that error appears in the printed specification of the above numbered patent requiring correction as follows: Page 2, lines 55 and 56, strike out the formula and insert instead.

Sulfur---------------------------------------------$16\frac{1}{2}$
Rubber Latex----------------------------------------1

And that the said Letters Patent should be read with these corrections therein that the same may conform to the record of the case in the Patent Office.

Signed and sealed this 5th day of February, A. D. 1935.

Leslie Frazer (Seal)                                       Acting Commissioner of Patents.